March 21, 1950 H. F. KAISER ET AL 2,500,948
X-RAY DIFFRACTION APPARATUS

Filed July 29, 1946 3 Sheets-Sheet 1

INVENTORS
LOUIS A. CARAPELLA
HERMAN F. KAISER
BY M.O.Hayes
ATTORNEY

March 21, 1950 H. F. KAISER ET AL 2,500,948
X-RAY DIFFRACTION APPARATUS
Filed July 29, 1946 3 Sheets-Sheet 2
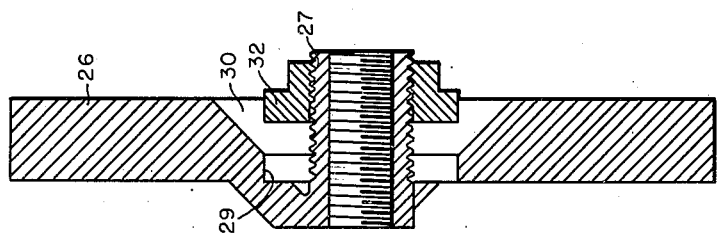
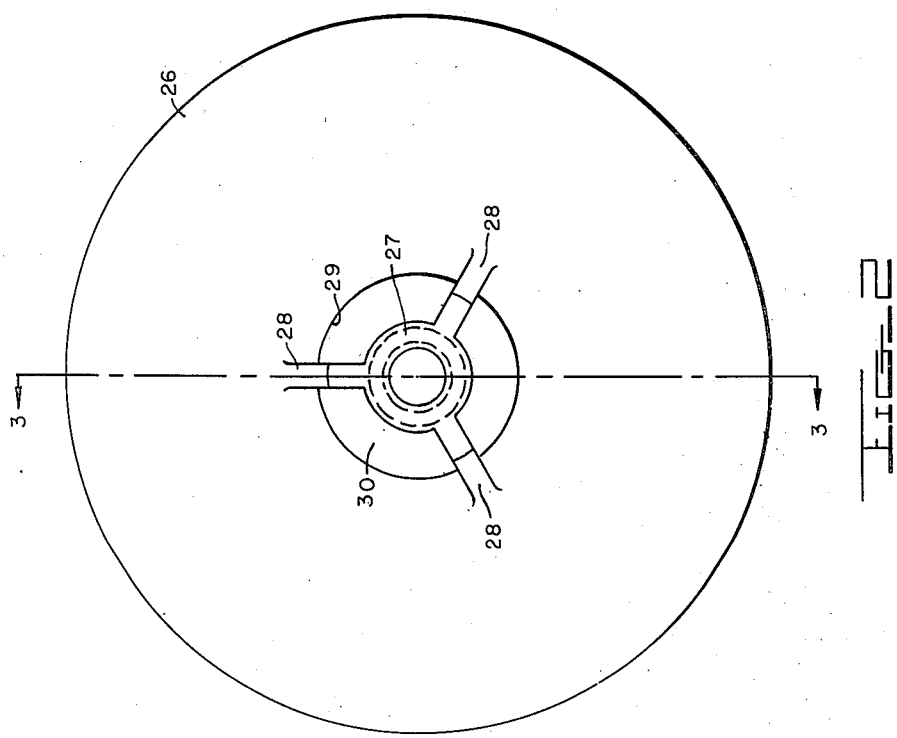
INVENTORS
LOUIS A. CARAPELLA
HERMAN F. KAISER
BY
*M. O. Hayes*
ATTORNEY Patented Mar. 21, 1950

2,500,948

UNITED STATES PATENT OFFICE 2,500,948

X-RAY DIFFRACTION APPARATUS

Herman F. Kaiser, Washington, D. C., and Louis A. Carapella, Pittsburgh, Pa.

Application July 29, 1946, Serial No. 686,830

14 Claims. (Cl. 250—52)

(Granted under the act of March 3, 1883, as amended April 30, 1928; 370 O. G. 757)

This invention relates to X-ray diffraction apparatus, and more particularly to an X-ray diffraction apparatus for studying crystalline structures so designed as to permit selection of a particular diffraction beam for study.

In the study of crystalline structures, and particularly in the precise determination of lattice constants of crystalline structures, it has become the practice in recent years to employ back reflection X-ray diffraction apparatus. A typical apparatus thus may include a source of X-rays, a collimating device, a specimen holder, and a detecting element, which may be a photo-sensitive film, or a device responsive to X-rays such as a Geiger-Mueller counter or an ionization chamber. Where the apparatus is to be used for studying the diffraction pattern of objects readily penetrable by X-rays or when precision measurements of lattice constants is not necessary, the detecting element is located on the opposite side of the object from that on which the X-ray source is located. Where, on the other hand, the object to be studied is too thick for effective penetration by X-rays or when maximum accuracy is essential, back reflections are employed and the detecting element is located intermediate the object and the X-rays, the X-rays normally passing through a suitable aperture, formed at the center of the detecting element and extending transversely therethrough, and then being diffracted or reflected back from the object onto the detecting element. Back reflection apparatus is generally preferable because of the higher degree of accuracy obtainable with use of "high angle" measurements, as is well known in the art.

In studying the diffraction pattern, it is highly useful to ascertain precisely the angular spacing between the diffracted beams and the X-ray axis and also the relative and absolute intensities of the diffracted beams. Where a photo-sensitive film is employed, it will be apparent that measurement of the angular spacing, while feasible, is a time consuming process. On the other hand, where measurement of the relative intensities of the diffracted beams is to be made by employing a photo-sensitive film and a device such as a photometer, the results to be obtained are not always accurate and may be unsuitable for comparative purposes because of the difficulty of precisely duplicating the exposure and development conditions. On the other hand, where a Geiger-Mueller counter or an ionization chamber or other similar device is employed, measurement of the angular spacing has required elaborate apparatus permitting shifting the position of the detecting element in order to ascertain the position of a diffracted or reflected beam.

An object of the present invention is to provide a new and improved X-ray diffraction apparatus and more particularly an X-ray diffraction apparatus for precision determination of lattice constants with rapidity.

A further object of the present invention is to provide an X-ray diffraction apparatus employing an ionization chamber or Geiger-Mueller counter so designed as to make possible precision determination of the angular spacing between diffraction beams and the incident X-ray axis as well as precision determination of the intensities of the diffracted beams.

In accordance with one embodiment of this invention, an X-ray diffraction apparatus may be provided comprising a source of X-rays, a collimating device, a specimen holder and a detecting element such as a Geiger-Mueller counter or an ionization chamber. In order to make possible determination of the "cone angle" of radiation diffracted from a given set of atomic planes in the specimen, a baffle is provided intermediate the specimen being studied and the detector, having an annular slit therein for exclusive transmission of diffracted radiation constituting a given beam-cone. The intermediate position of the baffle is adjustable to permit transmission of different cones, and the effective width of the annular slit is adjustable to insure transmission of only one thin cone of diffracted radiation. By adjusting the position of the baffle and the width of the slit, it is possible to select a single diffracted beam for study and to prevent the remaining diffracted beams from reaching the detector. By comparing the baffle position required to select each of two beams, the angular spacing between the beams and the X-ray axis may be readily computed. The intensity of any given beam is determined directly from the indication provided by the Geiger-Mueller counter or an ionization chamber.

Other objects and advantages of the present invention will be apparent from the following detailed description thereof taken in conjunction with the drawings wherein:

Fig. 2 is a detail, plan view of the screen shown in Fig. 1;

Fig. 3 is a vertical, sectional view of the screen shown in Fig. 2 taken substantially along the line 3—3;

Figure 1:
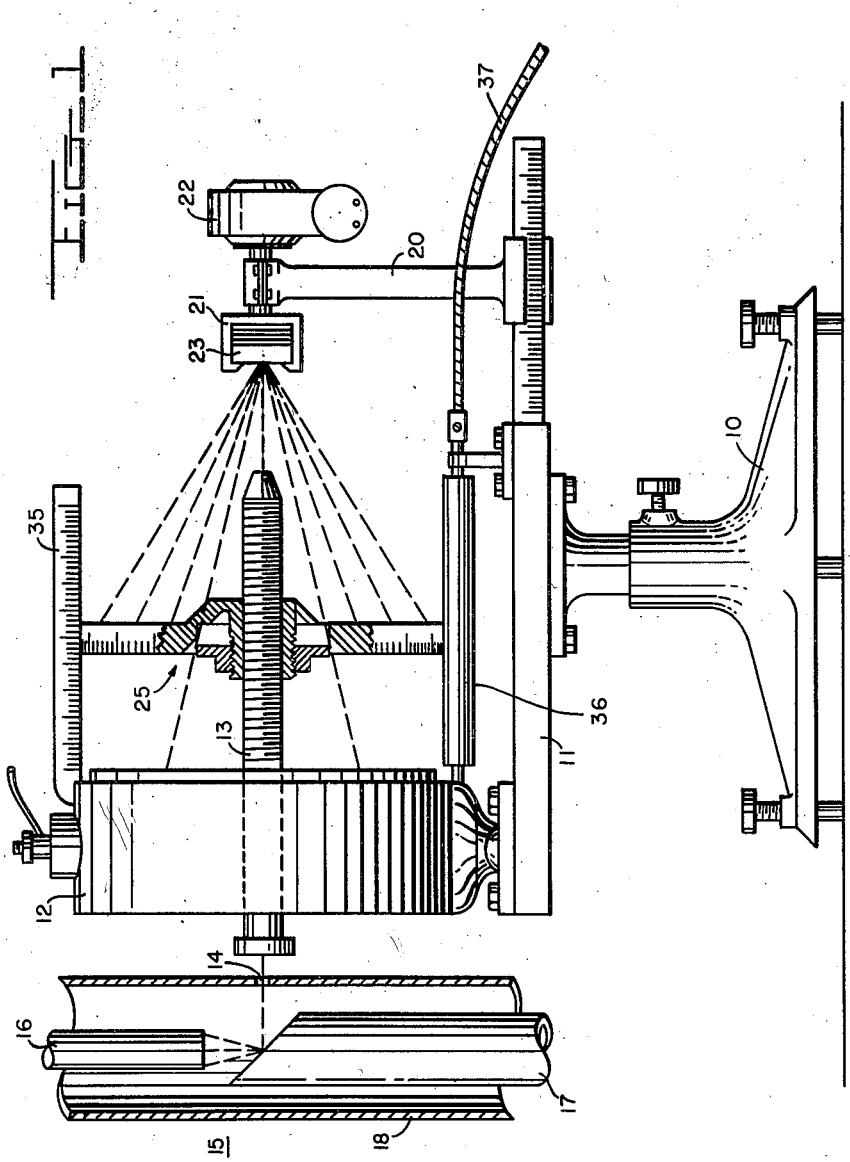
Fig. 1 is a simplified, side elevation of an X-ray diffraction apparatus constructed in accordance with one embodiment of the present invention and designed for studying a crystalline structure by back reflection.

Referring now to the drawings, and particularly to Fig. 1 thereof, it will be seen that the device of this invention is shown in conjunction with a substantially conventional back reflection X-ray diffraction apparatus comprising an adjustable pedestal base 10 on which is mounted a horizontally disposed bed 11. Rigidly secured to the left end of the bed 11, as viewed in Fig. 1, is an annular chamber 12 containing a gas which is ionized by X-rays. A Geiger-Mueller counter may be employed for this purpose. A collimating tube 13 extends through and is supported at the center of the ionization chamber 12 and the left end of the tube 13 is located adjacent an aperture 14 of an X-ray radiation source 15. Any suitable source of X-rays may be employed and for the purposes of illustrating the present invention an anode 17 and cathode 16 have been shown enclosed in a chamber 18. This could be built integrally with chamber 12 to simplify the apparatus. It will, of course, be apparent to those skilled in the art that the X-rays must be made monochromatic when a randomly oriented (polycrystalline) specimen is used. This can be easily accomplished by the well known use of filters placed over the window of the tube or in the collimator of the incident radiation (see Barrett, "Structure of Metals," p. 57).

A specimen supporting stand 20 is adjustably mounted on the right end of the bed 11 and is provided with a suitable specimen holder 21 which may be rotated by a motor 22, mounted on the stand 20. A specimen 23 is shown clamped in the specimen holder 21. The axis of rotation of the specimen is usually made parallel to the axis of the collimating tube 13 and the ionization chamber so that as the specimen is rotated, back reflection diffraction cones, sometimes referred to as Debye cones, will be diffracted or reflected on the ionization chamber 12.

The system so far described is suitable for measuring the total intensity of reflection of the diffracted beams which occur when a beam of X-rays is caused to strike aggregates of random oriented crystals such as are present in metals. However, in order to make this apparatus suitable for measuring precisely the angular spacing between the diffracted beams and the incident X-ray beam as well as the relative and absolute intensities of the diffracted beams, a baffle system or diaphragm 25 is provided and is adjustably mounted between the specimen holder 21 and the ionization chamber 12. Referring to Figs. 2 and 3 it will be seen that this baffle is formed by a large annular disc 26, which is supported on an axially disposed, internally and externally threaded sleeve 27 by three, small cross-section, radially extending fingers 28, the disc 26, sleeve 27, and fingers 28 being preferably integrally formed. The internal diameter of the central aperture 29 of the disc 26 is made substantially greater than the external diameter of the sleeve 27, thus providing an annular slit 30 through the center of the assembly for transmission of a diffracted beam-cone interrupted only by the three spider fingers 28.

It will be noted that the left portion of the central aperture 29 of the disc 26 is tapered outwardly to the left, as shown in Figure 3, and that a ring 32 having an external diameter slightly greater than the internal diameter of the aperture 29 is threadably mounted on the threaded periphery of the sleeve 27. By moving the ring 32 into the aperture 29 of the disc 26, by rotating the ring, the effective size of the annular slit 30 may be reduced, and conversely by moving the ring 32 out of the aperture 29, by rotating the ring in the opposite direction, the size of the annular slit 30 may be increased. The baffle assembly, as shown in Fig. 1, is threadably mounted on the periphery of the collimating tube by the sleeve 27, the tube being suitably threaded for this purpose so that the baffle may be moved along the collimating tube. The disc 26 and ring 32 are both made of a material capable of absorbing substantially completely such X-rays as may be diffracted or reflected from the specimen during examination.

It will be apparent now from the drawings that the baffle 25 interposed between the specimen and the ionization chamber may be so located and have its annular slit 30 so adjusted with respect to the diffracted beams of X-rays from the specimen as to prevent all but a selected conical beam from reaching the ionization chamber. Thus, the intensity of any given beam may be measured. In order to determine the diffraction angle (trigonometrically) of a given diffracted cone it is necessary to know the exact length of the base-leg of the triangle. Thus a calibrated scale 35 is mounted on the upper right side of the ionization chamber housing and extends to the right therefrom parallel to the bed 11 of the apparatus. Also, the periphery of the disc 26 is calibrated so that the position of the disc with respect to the specimen may be accurately determined. A peripheral contact roller 36 may be provided which engages the periphery of the disc 26 to cause rotation thereof and thereby to adjust the position of the disc, the roller 36 being driven through a flexible cable 37 which may be connected to a suitable motor (not shown). This system of adjustment is desirable because of the presence of X-rays. During operation the instrument is preferably covered with a lead lined hood (not shown) in order to afford additional protection against any scattered X-ray radiation and to exclude scattered radiation from the detector.

While the position of the disc is being changed a suitable indicating device, such as an electrical meter (not shown), associated with the Geiger-Mueller counter or ionization chamber is watched or automatically recorded. As soon as the position of the baffle is such that the circular slit 30 on the baffle permits the passage of a diffracted beam of X-ray radiation, this effect is immediately registered by the indicating device. The position of the baffle is then read from the scale 35 and the micrometer divisions along the periphery of the disc 26. By varying the size of the annular slit opening a narrow or broad X-ray beam is permitted to pass through the disc to the ionization chamber. This adjustability increases somewhat the precision with which the position of the baffle can be determined for a given diffracted beam since it permits eliminating closely adjacent beams by narrowing the slit until only a single beam is passed.

While a specific form of baffle has been shown and described, having an annular slit which is capable of being adjusted both in size and in position with respect to the diffraction cones, it will be understood that other types of baffles may be substituted therefor, such as a flexible cup or a double iris system. In general, however, it has been found that the baffle shown is both simple to construct and to adjust and accordingly is satisfactory for most conditions.

While in this description the slit is described as movable and the ionization chamber or counter is described as fixed, there is no reason why the latter may not also be attached permanently to the moving disc and move with it. This arrangement may offer some advantages but has the obvious disadvantage for intensity measurement that the measuring chamber counter is at variable distance from the diffracting source.

Figure 4:
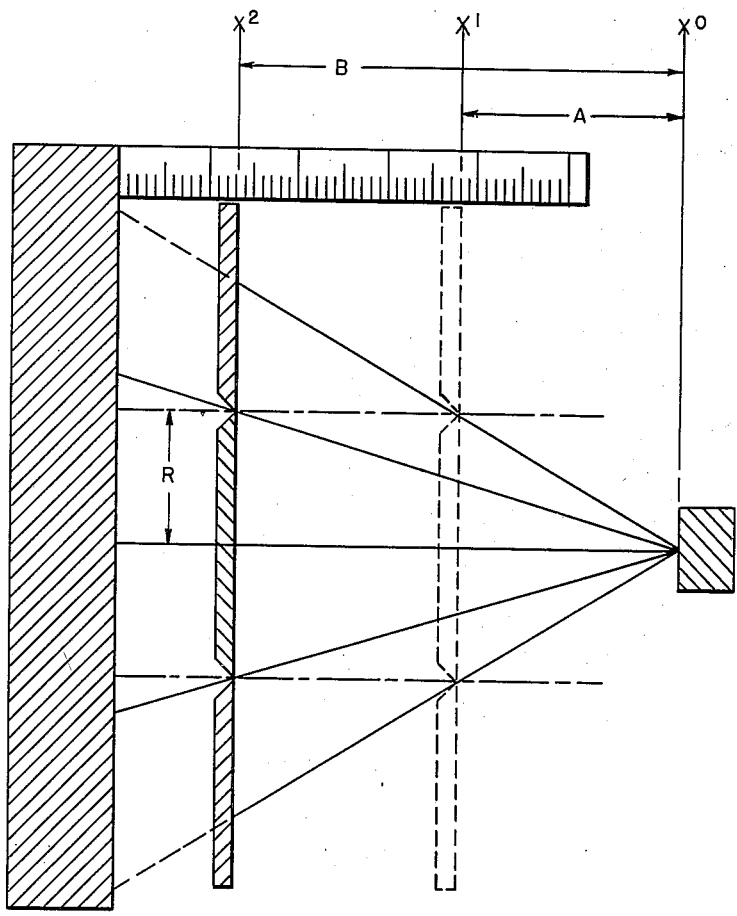
Fig. 4 is a diagrammatic view illustrating the method of calibration of the present apparatus.

Inasmuch as this apparatus is employed for the direct measurement of back reflection beam spacing, it is desirable to calibrate the unit against existing systematic errors. To illustrate the actual calibration of the instrument, the schematic diagram shown in Fig. 4 is employed. The calibration is performed by first establishing the position of the reference line $X_0$ with respect to the micrometer scale. This is accomplished by selecting a suitable calibrator and X-rays which will produce back reflection lines near to those of the specimen under consideration. After satisfying this prerequisite it is necessary to demonstrate how the back reflection spacings can be measured in terms of the micrometer scale on the instrument. In this connection, it can be readily shown that the following equation derived from the Bragg law of X-ray diffraction and other trigonometric relationship holds;

$$\phi = 2\cos^{-1}\left(\frac{n\lambda}{2d}\right) \quad (1)$$

wherein $\phi$ equals the supplementary diffraction angle; $n\lambda$ equals the wave length of the radiation; and $d$ equals the interplanar spacing. From the diagram in Fig. 4 this supplementary diffraction angle may also be expressed as follows:

$$\phi = \tan^{-1}\left(\frac{R}{X - X_0}\right) \quad (2)$$

where $R$ equals the radius of the circular slit; $X_0$ equals the position of the reference line and $X$ equals the position of the baffle. In order to establish the location of the reference line $X_0$ with the aid of a calibrator having a back reflection line at the angle $\phi$, Equation 2 then becomes:

$$X_0 = X_1 - \left(\frac{R}{\tan}\right)_\phi \quad (3)$$

Since the instrument has been calibrated, the various angles $\phi$ for the back reflection line are measured from the micrometer readings ($X_2$) according to this expression:

$$\phi = \tan^{-1}\left(\frac{R}{X_2 - X_0}\right) \quad (4)$$

From these values of $\phi$ the interplanar distances $d$ may be determined by employing Equation 1. The data can also be expressed in terms of lattice constants, provided the space geometry of the crystallographic system under consideration is known.

While but one embodiment of this invention has been shown and described and that in conjunction with a back reflection type of instrument, it will be readily apparent that an instrument designed for measuring the diffraction of transmitted X-rays could also employ the baffle system of this invention without departing from the spirit or scope thereof simply by locating the baffle between the specimen, and the sensitive element, which in this latter case would be disposed on the side of the specimen opposite from that on which the X-ray source is located.

The invention described herein may be manufactured and used by or for the Government of the United States of America for governmental purposes without the payment of any royalties thereon or therefor.

What is claimed is:

1. In an X-ray diffracting apparatus, an X-ray source, means for supporting a specimen in a position to present the specimen substantially perpendicularly to radiation from said source, an X-ray sensitive element mounted transverse the axis of said source and said specimen so as to be irradiated by diffracted X-rays from an irradiated specimen, said sensitive element being continuously responsive to variations in X-ray intensity, and baffle means having an adjustable annular aperture interposed transverse of the axis between said specimen and said sensitive element.

2. In an X-ray diffracting apparatus, an X-ray source, means for supporting a specimen in a position to present the specimen substantially perpendicularly to radiation from said source, an X-ray sensitive element mounted adjacent said specimen so as to be irradiated by back reflected diffracted X-rays from an irradiated specimen, said sensitive element being continuously responsive to variations in X-ray radiation intensity, and a baffle assembly interposed between said specimen and said sensitive element for preventing all but a selected portion of the back reflected diffracted X-rays from reaching said sensitive element comprising, an annular disc, a second disc having an external diameter at least equal to the internal diameter of said annular disc, said second disc being adjustably movable toward and away from the aperture in said annular disc to provide an annular slit of variable width.

3. In an X-ray diffraction apparatus, an X-ray source, means supporting a specimen in a position to present the specimen to radiation from said source, means to project a beam of X-rays from said source on to the specimen to produce back reflected X-rays in conical beams of different angles coaxial with the incident X-ray beam, X-ray detecting means positioned in the path of said conical beams, and a baffle diaphragm having an annular slit, said diaphragm being positioned in the path of said conical beams and intermediate the measuring means and the specimen, and movable back and forth between said specimen and said measuring means to selectively pass any one of the coaxial back reflected conical beams to the exclusion of the others.

4. In an X-ray diffraction apparatus, an X-ray source, means for supporting a specimen in a position to present the specimen to radiation from said source, an X-ray detecting element continuously responsive to variations in X-ray radiation intensity mounted between said source and said specimen so as to be irradiated by X-rays diffracted from the specimen, and annularly apertured baffle means intersecting the axis between said detecting means and the specimen, said baffle means being positionally adjustable for selecting various ones of a plurality of coaxial conical beams of different angles each to the exclusion of the other.

5. In an apparatus for measuring the relative intensity of X-rays back reflected from a specimen at different angles, an X-ray source directing a beam of X-rays toward and substantially perpendicular to the specimen to produce a plurality of concentric conical beams of back reflected X-rays of different angles, X-ray detecting means situated in the path of said conical beams, and apertured baffle means interposed transverse the axis between said source and the specimen for selectively passing any one of said conical beams.

6. In an apparatus of the class described, a source of X-rays, means for back reflecting said X-rays from a specimen in a conical beam concentric about the axis of the incident beam, X-ray detecting means in detecting relation with said reflected beam, and a diaphragm positioned in the path of said conical beam between said specimen and said detecting means and having therein an adjustable-width annular slit coaxial with the said incident beam.

7. In an X-ray diffracting apparatus, a source of substantially monochromatic X-rays, means for supporting a randomly oriented crystalline specimen in a position to be substantially perpendicularly irradiated by said X-rays, an X-ray sensitive element mounted so as to be irradiated by diffracted X-rays from an irradiated randomly oriented crystalline specimen, and annularly apertured baffle means interposed transverse the axis between said specimen and said sensitive element and adjustable on said axis for the purpose of limiting the angle, radiation diffracted at which, will be transmitted through said baffle, the said annular aperture in said baffle being also adjustable for the purpose of further limiting the said angle.

8. In an X-ray diffraction apparatus, a source of X-rays in irradiating relation with a test specimen, an X-ray sensitive detector element in detecting relation with radiation diffracted from said specimen and positioned at a fixed, constant distance therefrom, and annularly apertured baffle means adjustably disposed intermediate said specimen and said sensitive element.

9. In an X-ray diffraction apparatus, a source of X-rays in irradiating relation with a test specimen, an X-ray sensitive element in detecting relation with back reflection diffracted radiation from said secimen and positioned at a fixed, constant distance therefrom, and annularly axially apertured baffle means disposed intermediate said specimen and said sensitive element transverse the axis therebetween and longitudinally adjustable on said axis.

10. In an X-ray diffraction apparatus, a source of monochromatic X-rays in irradiating relation with a randomly oriented crystalline test specimen, an X-ray sensitive detector element in detecting relation with back reflection diffracted radiation from said specimen and annularly axially apertured baffle means adjustably positioned transversely intermediate said specimen and said sensitive element, said baffle means being adjustable independently of said detector element.

11. In apparatus of the class described, an apertured baffle element comprising, a disc member provided with an axial circular opening, a coaxial threaded sleeve member disposed in said opening and supported therein by finger means attached to said disc member and a collar member whose outside diameter is substantially the same as that of said opening threadably mounted on said sleeve member.

12. The method of measuring the angle of back reflection of a given beam of radiation diffracted from a specimen comprising, irradiating a specimen with X-radiation, disposing an X-ray sensitive detector element in the path of the back reflected radiation from said specimen, disposing a slitted baffle element intermediate said specimen and said detector and transverse the axis of incident radiation, varying the intermediate position of said baffle means until said given back reflected beam is transmitted thru said slit to said detector element and measuring the distance from said specimen to said baffle element.

13. The method of measuring the angle of back reflection of a beam of radiation diffracted from a specimen comprising, irradiating a specimen with a beam of incident X-radiation, disposing an X-ray sensitive detector element in the path of back reflected radiation from said specimen, disposing a slitted baffle element intermediate said specimen and said detector transverse to the axis of the incident radiation said slit of said baffle member being peripheral with respect to said axis, adjusting longitudinally the intermediate position of said baffle between said specimen and said detector until only the said given back reflected diffracted beam is transmited thru said slit to said detector, and measuring the distance from said specimen to said baffle element.

14. The method of measuring the angle of back reflection of a beam of radiation diffracted from a specimen comprising, irradiating a specimen with a beam of incident X-radiation, disposing an X-ray sensitive detector element in the path of back reflected radiation from said specimen, disposing a baffle element of the type defined in claim 11 intermediate said specimen and said detector and transverse to the axis of said incident radiation, moving the collar member of said baffle element near the disc member thereof on the sleeve member thereof to narrow the effective width of the slit aperture, moving the entire baffle element along the axis of said incident radiation until only a single diffracted beam can be transmitted through said narrowed slit aperture to said detector element, and measuring the distance from said specimen to said baffle element.

HERMAN F. KAISER.
LOUIS A. CARAPELLA.

REFERENCES CITED

The following references are of record in the file of this patent:

UNITED STATES PATENTS

| Number | Name | Date |
|---|---|---|
| 1,865,441 | Mutscheller | July 5, 1932 |
| 1,993,058 | Hahn | Mar. 5, 1935 |
| 2,079,900 | Cohn | May 11, 1937 |
| 2,380,235 | Harker | July 10, 1945 |
| 2,383,764 | Bond | Aug. 28, 1945 |
| 2,386,785 | Friedman | Oct. 16, 1945 |

OTHER REFERENCES

The measurement of stress by X-rays, by D. E. Thomas, Journal of Scientific Instruments, vol. 18, 1941, pp. 135–138.